United States Patent
Abe et al.

(10) Patent No.: US 10,097,385 B2
(45) Date of Patent: Oct. 9, 2018

(54) SATELLITE RADIO SIGNAL RECEIVER, ELECTRONIC TIMEPIECE, DATE AND TIME ACQUIRING METHOD AND RECORDING MEDIUM

(71) Applicant: CASIO COMPUTER CO., LTD., Tokyo (JP)

(72) Inventors: Hideo Abe, Tokorozawa (JP); Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/075,677

(22) Filed: Mar. 21, 2016

(65) Prior Publication Data

US 2016/0380672 A1 Dec. 29, 2016

(30) Foreign Application Priority Data

Jun. 24, 2015 (JP) ................................ 2015-126237

(51) Int. Cl.
*H04K 1/10* (2006.01)
*H04W 4/00* (2018.01)
(Continued)

(52) U.S. Cl.
CPC .. *H04L 25/03292* (2013.01); *H04L 25/03019* (2013.01); *H04L 25/067* (2013.01)

(58) Field of Classification Search
CPC . H04L 2025/03426; H04L 2025/03414; H04L 25/022; H04L 25/03159;
(Continued)

(56) References Cited

U.S. PATENT DOCUMENTS

| 2002/0005802 | A1* | 1/2002 | Bryant | G01S 19/24 342/357.64 |
|---|---|---|---|---|
| 2014/0184442 | A1 | 7/2014 | Large et al. | |
| 2014/0240170 | A1* | 8/2014 | Rudow | G01S 19/04 342/357.42 |

FOREIGN PATENT DOCUMENTS

| JP | H11-223686 A | 8/1999 |
|---|---|---|
| JP | 2009-036748 A | 2/2009 |

(Continued)

OTHER PUBLICATIONS

Notification of Reasons for Refusal dated Dec. 13, 2016 received in Japanese Patent Application No. JP 2015-126237 together with an English language translation.

(Continued)

*Primary Examiner* — Sam K Ahn
*Assistant Examiner* — Sarah Hassan
(74) *Attorney, Agent, or Firm* — Scully, Scott, Murphy & Presser, P.C.

(57) ABSTRACT

A satellite radio signal receiver includes a receiving section which receives radio signals from satellites and demodulates the signals to identify bits of the demodulated signals as received bits; and a processor. The processor compares each received bit of the satellites with estimated bits which are estimated to be received within a possible deviation range from a current date and time acquired as a reception timing of the received bit to obtain comparison result information between the received bits and the estimated bits in relation to deviations within the possible deviation range with respect to each of the satellites, integrates the comparison result information on the received bits of the satellites, specifies a deviation that satisfies a match condition of the received bits and the estimated bits based on the integrated comparison result information, and acquires date and time (Continued)

information based on the deviation that satisfies the match condition.

17 Claims, 8 Drawing Sheets

(51) Int. Cl.
H04L 25/03 (2006.01)
H04L 25/06 (2006.01)

(58) Field of Classification Search
CPC ......... H04L 25/03305; H04L 25/03178; H04L 25/03286; H04L 5/0023; H04L 25/03019; H04L 25/03171; H04L 25/03203; H04L 1/0057; H04L 1/00
USPC .......................................... 375/260; 370/338
See application file for complete search history.

(56) References Cited

FOREIGN PATENT DOCUMENTS

JP     2009-053182 A       3/2009
JP      2009053183    *   3/2009

OTHER PUBLICATIONS

First Office Action dated May 15, 2018 received in Chinese Patent Application No. CN 201610179671.8 together with an English language translation.

* cited by examiner

FIG.2
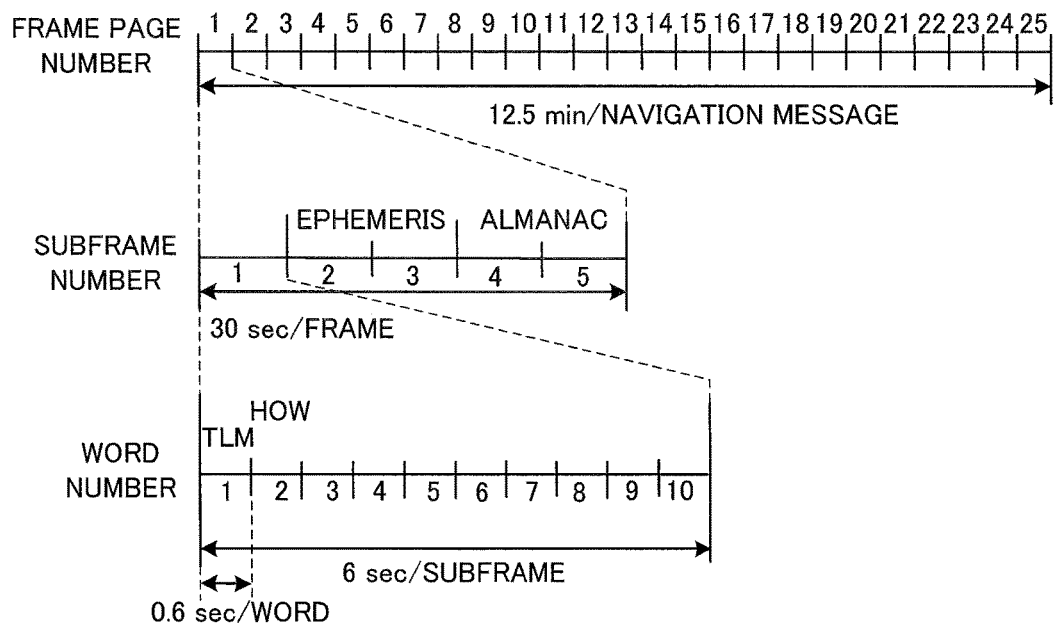
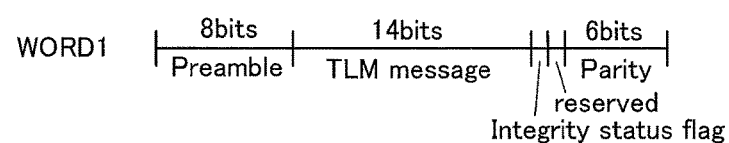
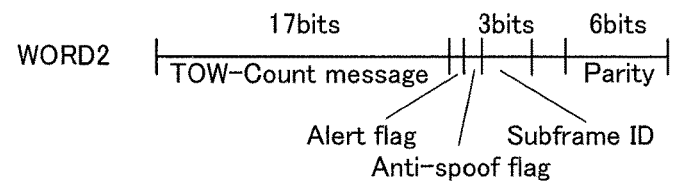
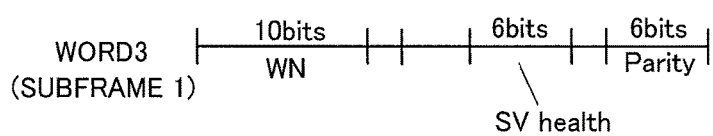

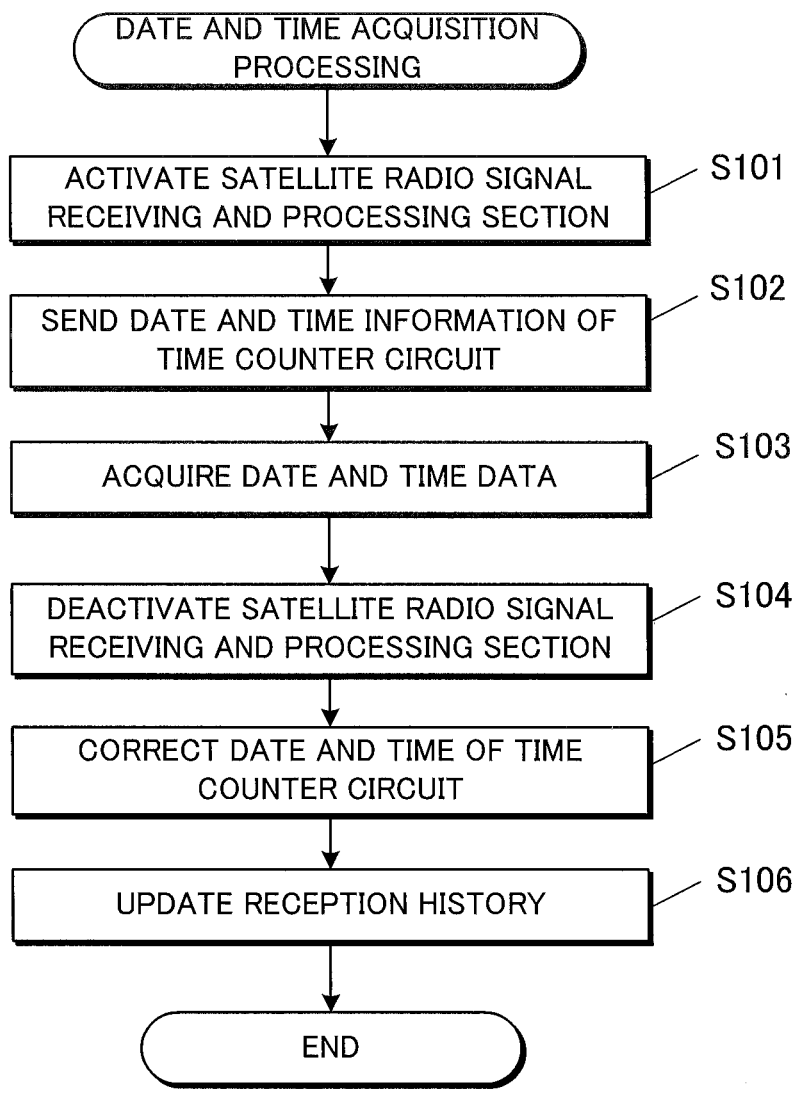

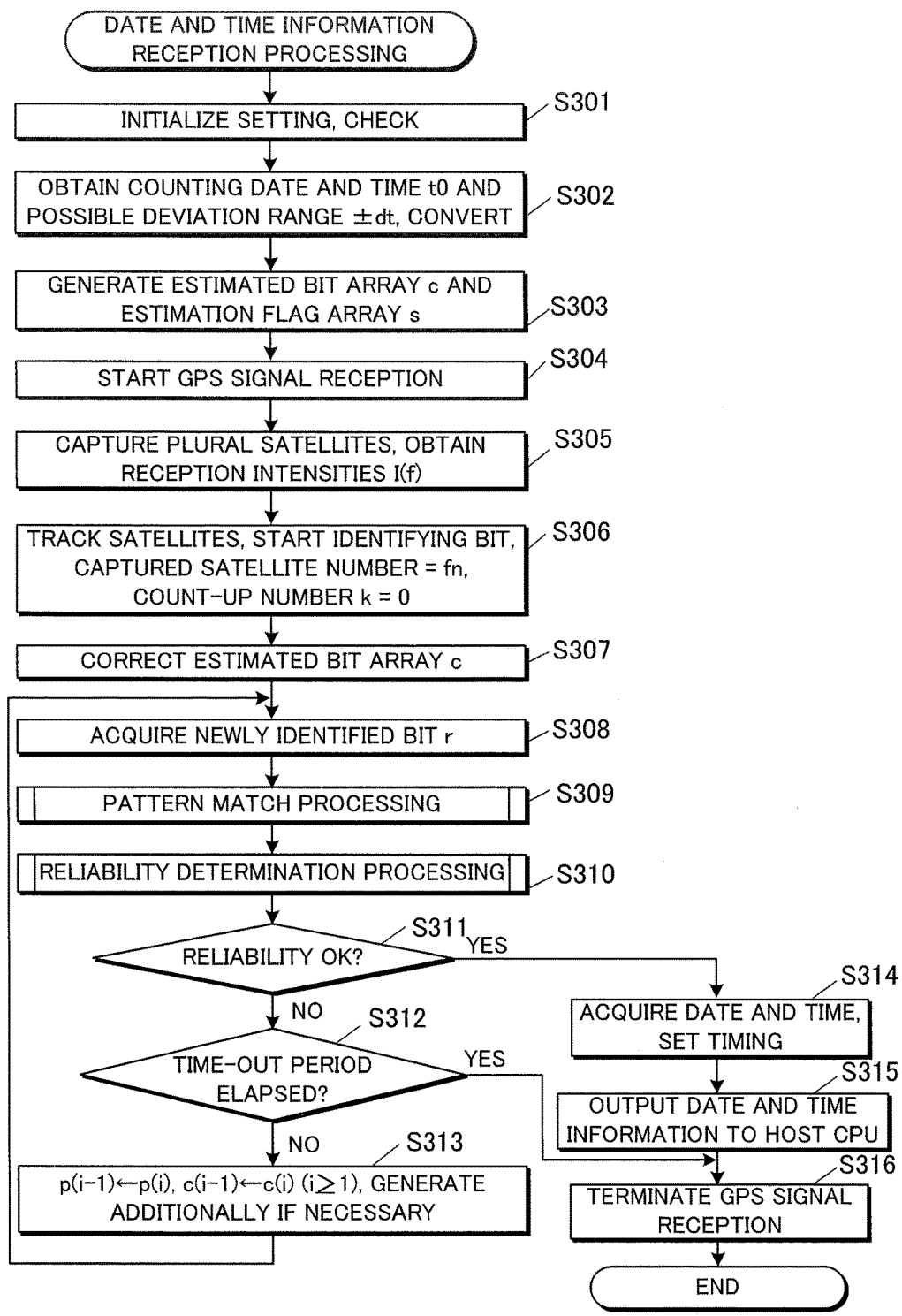

SATELLITE RADIO SIGNAL RECEIVER, ELECTRONIC TIMEPIECE, DATE AND TIME ACQUIRING METHOD AND RECORDING MEDIUM

CROSS REFERENCE TO RELATED APPLICATION

This application is based upon and claims the benefit of priority under 35 USC 119 of Japanese Patent Application No. 2015-126237 filed on Jun. 24, 2015, the entire disclosure of which, including the description, claims, drawings and abstract, is incorporated herein by reference in its entirety.

BACKGROUND OF THE INVENTION

Field of the Invention

The present invention relates to a satellite radio signal receiver, an electronic timepiece, a date and time acquiring method and a recording medium.

There have been electronic timepieces (radio timepieces) that have a function of keeping their counting time correct by receiving a radio signal from a navigation satellite (positioning satellite) of the GNSS (Global Navigation Satellite System) and acquiring date and time information. Such radio timepieces do not require a user manual operation and can keep the counting and displaying date and time correct all over the world.

However, receiving a satellite radio signal places a load much greater than that of counting or displaying the date and time in an electronic timepiece. Accordingly, a problem with such radio timepieces is that a function of receiving a satellite radio signal requires a large battery, which results in the increased size and weight of the electronic timepiece. To cope with the problem, a variety of techniques for reducing power consumption have been developed.

One of such techniques for reducing power consumption is to reduce the reception time of a radio signal by receiving only minimal information. For example, JP 2009-36748A, which is a Japanese patent laid-open publication, discloses a technique of receiving a predetermined part containing date and time information but suspending the reception according to the format of the signal (navigation message) transmitted from GPS satellites while bit arrays of unnecessary information are transmitted. Another technique is to synchronize the start of signal reception with the timing of transmission of necessary information by using the current date and time information counted in an own device.

However, since the accuracy of acquired information depends on the number of bits and the number of information, multiple receptions of the date and time information is required for avoiding a false identification of the acquired date and time and improving the accuracy, which results in an increase in reception time.

SUMMARY OF THE INVENTION

It is an object of the present invention to provide a satellite radio signal receiver, an electronic timepiece, a date and time information acquiring method and a recording medium having a program thereon that can acquire correct date and time information more reliably in a short time.

To achieve the object described above, a satellite radio signal receiver of the present invention includes: a receiving section which receives radio signals from a plurality of satellites and demodulates the signals to identify bits of the demodulated signals as received bits; and a processor, wherein the processor compares each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites, wherein the processor integrates the comparison result information on the received bits of the plurality of satellites, wherein the processor specifies a deviation that satisfies a predetermined match condition of the received bits and the estimated bits based on the integrated comparison result information, and wherein the processor acquires date and time information based on the deviation that satisfies the predetermined match condition.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 2 illustrates the format of a navigation message transmitted from GPS satellites;

FIG. 5 is a flowchart of the control steps of date and time acquisition processing;

FIG. 6 is a flowchart of the control steps of date and time information reception processing;

DETAILED DESCRIPTION

Figure 1:
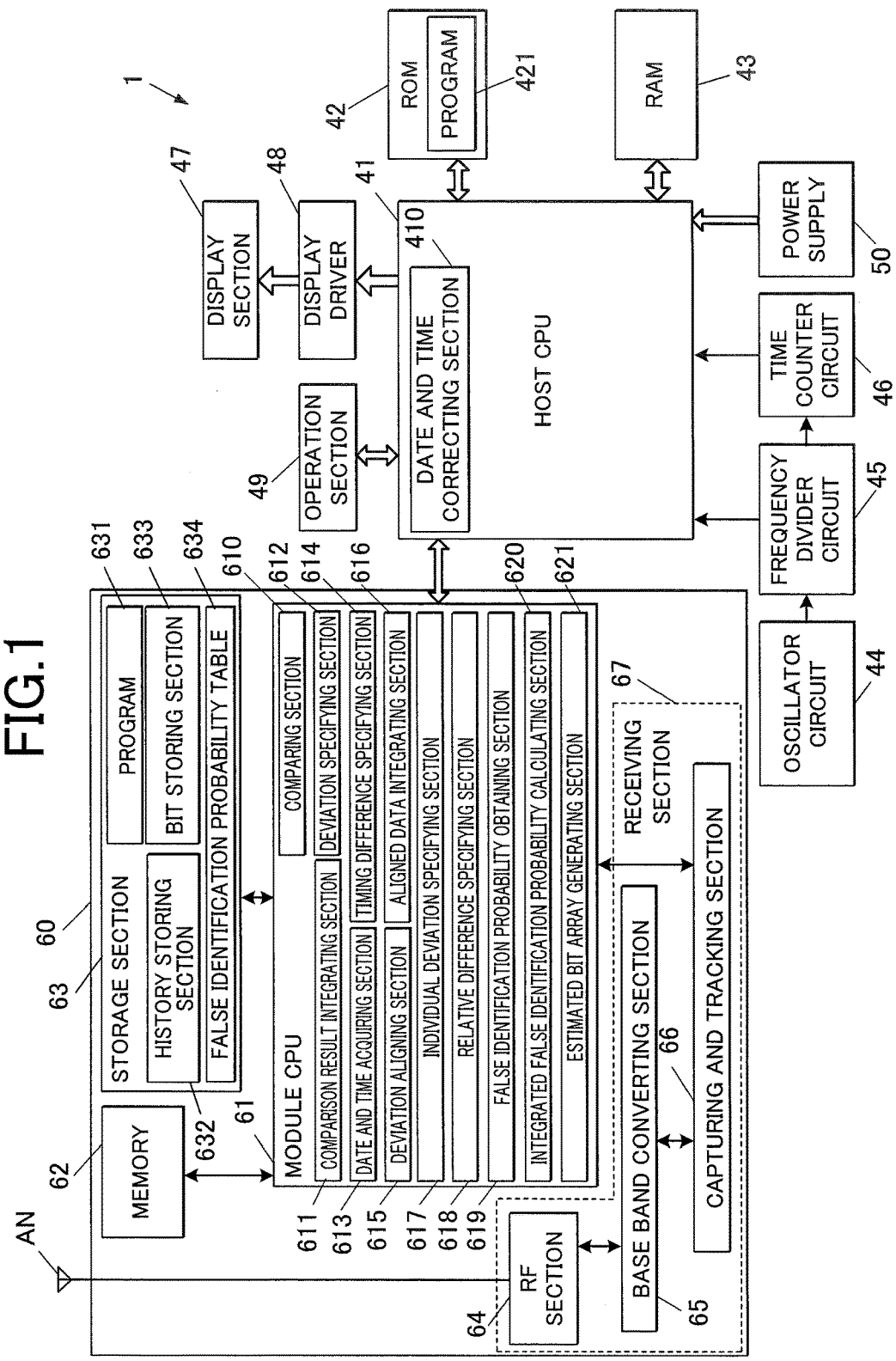
FIG. 1 is a block diagram of an electronic timepiece according to an embodiment of the present invention.

Hereinafter, an embodiment of the present invention will be described referring to the drawings. FIG. 1 is a block diagram illustrating the functional configuration of an electronic timepiece 1, which includes a satellite radio signal receiver of the present invention.

The electronic timepiece 1 is capable of receiving and demodulating a radio signal at least from a positioning satellite (hereinafter referred to as a GPS satellite) of the GPS (Global Positioning System) of the United States and acquiring date and time information.

The electronic timepiece 1 includes a host CPU (central processing unit) 41 (data and time correcting section 410) as an electronic timepiece processor, a ROM (read only memory) 42, a RAM (random access memory) 43, an oscillator circuit 44, a frequency divider circuit 45, a time counter circuit 46 as a time counting section, a display section 47, a display driver 48, an operation section 49, a power supply 50, a satellite radio signal receiving and processing section 60 as a satellite radio signal receiver, an antenna AN and the like.

The host CPU 41 performs a variety of processing so as to integrally control the overall operation of the electronic timepiece 1. The host CPU 41 reads out a control program from the ROM 42 and loads it on the RAM 43 so as to perform a variety of processing, e.g. displaying the date and time, computing and displaying related to various functions and the like. Further, the host CPU 41 controls the satellite radio signal receiving and processing section 60 to receive a radio signal from a positioning satellite, so as to acquire required date and time information and position information from the received signal.

The ROM 42, which is constituted by a mask ROM, a rewritable non-volatile memory or the like, stores the control program, a default setting data and the like. The control program includes a program 421 that is used for the control of a variety of processing for acquiring a variety of information from a positioning satellite.

The RAM 43, which is constituted by a volatile memory such as a SRAM and a DRAM, stores temporary data to provide a workspace for the host CPU 41 and also stores a variety of setting data. Such setting data includes hometown setting, summer time setting in counting and displaying the date and time and the like of the electronic timepiece 1. A part or all of the setting data may be stored in a non-volatile memory instead of the RAM 43.

The oscillator circuit 44 generates and outputs a predefined frequency signal. The oscillator circuit 44 is constituted by, for example, a quartz oscillator.

The frequency divider circuit 45 divides the frequency signal input from the oscillator circuit 44 into signals with a frequency that can be used in the time counter circuit 46 and the host CPU 41, and output the signals to them. The frequency of the output signals may be variable according to a setting by the host CPU 41.

The time counter circuit 46 counts the number of predetermined frequency signals (clock signals) input from the frequency divider circuit 45 and adds the counted number to an initial value so as to count the current date and time. The time counter circuit 46 may either be constituted as software that changes a value stored in an RAM or include a dedicated counter circuit. The date and time counted by the time counter circuit 46 may be any one of the elapsed time from a predetermined time point, the UTC (Coordinated Universal Time), the date and time of a preset hometown (local time) and the like, but is not particularly limited thereto. The date and time counted by the time counter circuit 46 is not necessarily held in the form of year-month-day and hour-minute-second. The clock signals input from the frequency divider circuit 45 to the time counter circuit 46 is slightly deviated from the correct lapse of time, and the deviation length per day (rate of clock) varies depending on the operation environment such as temperature, and is typically within the range ±0.5 sec.

The display section 47 includes, for example, a display such as a liquid crystal display (LCD) and an organic EL (electro-luminescent) display. The display section 47 digitally displays the date and time and screen images related to various functions in the form of a dot matrix or segments or a combination thereof.

The display driver 48 outputs a drive signal to the display section 47 according to the type of the display based on a control signal from the host CPU 41 so as to display a screen image on the display.

The display section 47 may include an analog display in which a pointer (hand) or the like turns by a stepping motor or the like. In this case, a driver circuit for the stepping motor is provided as the display driver 48.

The operation section 49 receives a user operation and outputs an electric signal according to the input user operation to the host CPU 41 as an input signal. The operation section 49 includes, for example, a push-button switch, a crown switch and the like.

Alternatively or additionally, a touch sensor may be overlapped on the display of the display section 47 so that the display serves as a touch panel that outputs an operation signal according to the location and manner of a user touch operation detected by the touch sensor. In this case, the display section 47 and the operation section 49 may be integrally formed with each other.

The power supply 50, which includes a battery, supplies electric power required for the operation of the electronic timepiece 1 to each component at a predetermined voltage. In this embodiment, the battery of the power supply 50 is constituted by a solar panel and a secondary battery. The solar panel generates electric power from incident light and supplies the electric power to the components such as the host CPU 41. When an excess electric power is generated, it is stored in the secondary battery. On the contrary, when the electric power that the solar panel generates from incident light from the outside is not sufficient relative to the power consumption, an electric power is supplied from the secondary battery. Alternatively, a primary battery such as a button battery may be used as the battery.

The satellite radio signal receiving and processing section 60 receives a radio signal from a positioning satellite by tuning the antenna AN to the radio signal and identifying and capturing the C/A code (pseudo random noise) that is unique to the positioning satellite. The satellite radio signal receiving and processing section 60 then demodulates and decodes it to a navigation message transmitted from the positioning satellite and thereby acquires necessary information. The satellite radio signal receiving and processing section 60 includes a module CPU 61 as a processor (a comparing section 610, a comparison result integrating section 611, a deviation specifying section 612, a date and time acquiring section 613, a timing difference specifying section 614, a deviation aligning section 615, an aligned data integrating section 616, an individual deviation specifying section 617, a relative difference specifying section 618, a false identification probability obtaining section 619, an integrated false identification probability calculating section 620 and an estimated bit array generating section 621), a memory 62, a storage section 63 that stores a probability table, a receiving section 67 (an RF section 64, a base band converting section 65, a capturing and tracking section 66), and the like. The module CPU 61 includes the comparing section 610, the comparison result integrating section 611, the deviation specifying section 612, the date and time acquiring section 613, the timing difference specifying section 614, the deviation aligning section 615, the aligned data integrating section 616, the individual deviation specifying section 617, the relative difference specifying section 618, the false identification probability obtaining section 619, the integrated false identification probability calculating section 620 and the estimated bit array generating section 621. These comparing section 610, comparison result integrating section 611, deviation specifying section 612, date and time acquiring section 613, timing difference specifying section 614, deviation aligning section 615, aligned data integrating section 616, individual deviation specifying section 617, relative difference specifying section 618, false identification probability obtaining section 619, integrated false identification probability calculating section 620 and estimated bit array generating section 621 may include either single CPU as a whole or individual CPUs that perform their respective processing, or the host CPU 41 or the like may perform a part or a whole of their processing outside of the satellite radio signal receiving and processing section 60.

The module CPU 61 controls the satellite radio signal receiving and processing section 60 according to a control signal from the host CPU 41, an input of the setting data, and the like. The module CPU 61 reads out a necessary program and setting data from the storage section 63 to operate an RF section 64, a base band converting section 65 and a capturing and tracking section 66. The module CPU 61 thereby receives and demodulates a radio signal from a positioning satellite so as to acquire the date and time information. In addition to decoding a received radio signal to acquire the date and time information, the module CPU 61 can also compare a demodulated received bit array with a preset bit array for comparison (comparison bit array) without decoding the signal so as to detect match or mismatch between them.

The memory 62 is constituted by a RAM that provides a workspace for the module CPU 61 of the satellite radio signal receiving and processing section 60. Further, the memory 62 temporary stores a bit array data that is generated for comparison with a received bit array.

The storage section 63 stores various setting data related to GPS positioning and the history of positioning and date and time information acquisition. The storage section 63 is constituted by a non-volatile memory of any type such as a flash memory and an EEPROM (electrically erasable and programmable read only memory). Data that are stored in the storage section 63 include precise orbit information (ephemeris) and estimated orbit information (almanac) of each positioning satellite, the date and time and the position acquired in the last positioning, and the like. The storage section 63 further stores data of time zones and utilization of summer time around the world as a time difference table. When positioning is performed, the time difference table is referenced so that the local time information at the current location, such as the time difference of the standard time from the Coordinate Universal Time (UTC) and utilization of summer time, is specified. When the date and time information is acquired, local time is calculated in accordance with information of time zones and utilization of summer time which is already set.

The data that the storage section 63 stores includes a program 631, a history storage section 632, a bit storage section 633 and a false identification probability table 634 as the probability table. When an acquisition of the date and time information or a positioning is performed, the program 631 is read out and executed by the module CPU 61. When the program 631 is executed, the history storage section 632 that stores the last reception history and the bit storage section 633 that stores data on an identified bit array in the last reception (history bit array) are referenced and utilized. Further, the false identification probability table 634 is referenced in a reliability determination of the date and time information, which is described below.

The receiving section 67 includes the RF section 64, the base band converting section 65, the capturing and tracking section 66 and the like.

The RF section 64 receives a satellite radio signal at the L1 band (1.57542 GHz in GPS satellites) and selectively passes and amplifies the signal from a positioning satellite to convert it to an intermediate frequency signal. The RF section 64 includes an LNA (low noise amplifier), a BPF (band-pass filter), a local oscillator, a mixer and the like.

The base band converting section 65 applies the C/A code of the positioning satellite to the intermediate frequency signal obtained by the RF section 64 so as to acquire a base band signal, i.e. a bit array (received bit array) of the navigation message (predetermined format).

The capturing and tracking section 66 calculates correlation values of the C/A codes at different phases of the respective positioning satellites with respect to the intermediate frequency signal obtained by the RF section 64. The capturing tracking section 66 thereby specifies the peak of the correlation values so as to identify the received signal from the positioning satellite and the phase of the received signal. Further, in order to successively obtain a bit array of the navigation message from the positioning satellite by using the identified C/A code and the phase thereof of the positioning satellite, the capturing and tracking section 66 performs feedback of the phase information to the base band converting section 65 and the like and demodulates the received radio signal to identify the bits (received bits).

The satellite radio signal receiving and processing section 60 is supplied with electric power directly from the power supply 50, and the host CPU 41 switches it. That is, except for the time while the satellite radio signal receiving and processing section 60 receives a radio signal from a positioning satellite or performs the calculation for date and time acquisition and positioning, the power thereof is off independently from the always-on host CPU 41.

Next, the format of a navigation message transmitted from a GPS satellite will be described.

In the GNSS, positioning satellites are dispersed on orbits so that transmitted radio signals from different positioning satellites can be simultaneously received at any point on the ground. By acquiring information on the current position of a positioning satellite and the date and time information from at least four positioning satellites (at least three satellites when the position to be determined is assumed to be at the ground level) among the positioning satellites that transmit a receivable signal, it becomes possible to determine the position coordinate in a three-dimensional space and the date and time based on the acquired data and the deviations of the acquisition times, i.e. the differences in propagation time (distance) between the positioning satellites.

By acquiring the date and time information from a single positioning satellite, it becomes possible to determine the date and time within an error due to the propagation time of the received radio signal from the positioning satellite. When utilizing a GPS satellite, since its orbit has an approximately circular shape with a radius of 26600 km, the reception date and time deviates approximately 20 msec when the satellite is located at the zenith or on the horizon with respect to the ground. Considering an ordinary propagation distance, the date and time can be acquired to an accuracy of approximately ±10 msec.

A positioning satellite transmits information on the date and time, information on the position of positioning satellites, status information such as health status of positioning satellites and the like, which are coded in a predetermined format and are further modulated into a spread spectrum by a C/A code (pseudo random noise). Each positioning system defines its own signal transmission format (the format of a navigation message).

FIG. 2 illustrates the format of a navigation message transmitted from a GPS satellite.

In the GPS, each GPS satellite transmits 25 pages of frame data each having a length of 30 seconds. Accordingly, a full set of data is output every 12.5 minutes. The GPS uses C/A codes that are unique to each GPS satellite. Each C/A code consists of an array of 1023 fragments (chips) and is repeatedly transmitted every 1 msec at a frequency of 1.023 MHz.

Each frame data consists of five subframes (each having a length of 6 seconds) so that the subframes are transmitted on a cycle (transmission cycle) of 6 seconds. Each subframe includes the date and time information in a unit of 6 seconds and a fixed code that is constant regardless of the transmission cycle. Further, each subframe consists of 10 words (each having a length of 0.6 sec, referred to as Word 1 to Word 10 in order). Each word is a 30-bit code. The data format of Word 1 and Word 2 are the same in all subframes. Word 1 contains the Preamble of an 8-bit fixed code followed by the 14-bit Telemetry Message (TLM Message), and thereafter further contains the 1-bit Integrity Status Flag, a 1-bit spare bit and 6-bit parity data in the written order. Word 2 contains the 17-bit TOW-Count (also referred to as the Z-Count) representing the elapsed time in a week, which is the above-described date and time information in a unit of 6 seconds, followed by the Alert Flag and the Ant-Spoof Flag each composed of a single bit. Further, Word 2 subsequently contains the 3-bit subframe-ID representing the subframe number (cycle number), two parity data matching bits and 6-bit parity data in the written order. Since the subframe-ID is a code (dependent bit array part) that changes on a cycle of 6 seconds (according to a predetermined relationship) as with the TOW-Count, the consistency with the subframe-ID and the TOW-Count can be used for checking the date and time as time-dependent information.

The data of Word 3 or later differs according to the subframes. Word 3 of Subframe 1 contains the WN (week number) of the first 10 bits and the health status of a positioning satellite (SV health) represented by 6 bits. Subframe 2 and Subframe 3 mainly contains the Ephemeris (precise orbit information). As a part of Subframe 4 and Subframe 5, the Almanac (predicted orbit information) is transmitted.

The date and time counted in a GPS satellite (GPS time) does not reflect the deviation caused by insertion of leap seconds. Accordingly, the GPS time is deviated from the UTC time, and it is required to convert the date and time acquired by receiving a radio signal from a GPS satellite into the UTC time before an output. Further, in order to predict and control the timing of receiving the radio signal from the GPS satellites or to estimate a bit array to be received based on the date and time counted in the time counter circuit 46, it is required to covert the date and time of the time counter circuit 46 into the GPS time. Such deviation due to leap seconds is acquired and stored in the storage section 63 or the like beforehand.

Next, acquisition of the date and time information in the electronic timepiece 1 according to this embodiment will be described.

Figure 3A:
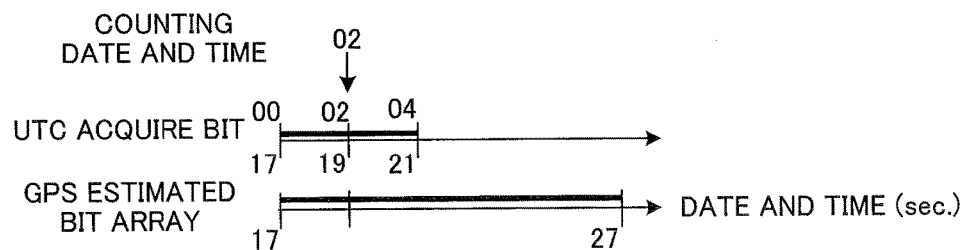
FIG. 3A illustrates comparison of a bit array in the electronic timepiece of the embodiment.
Figure 3B:
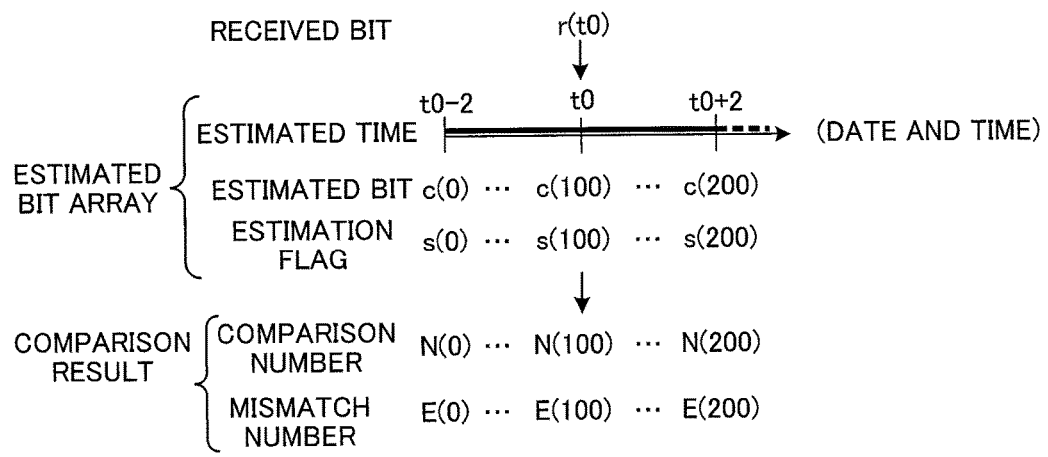
FIG. 3B illustrates comparison of a bit array in the electronic timepiece of the embodiment.

FIG. 3A and FIG. 3B illustrate a comparison of a bit array in the electronic timepiece 1 according to this embodiment.

In the electronic timepiece 1 of this embodiment, at first, a possible deviation range of the date and time (current date and time) counted in the time counter circuit 46 is estimated based on the elapsed time since the last correction of the date and time of the time counter circuit 46. For example, when 4 days (96 hours) have elapsed since the last correction of the date and time, the possible deviation range is estimated to be within ±2 seconds on the basis that a deviation per a day is within ±0.5 sec as described above.

As illustrated in FIG. 3A, a bit that is received and identified on a certain day at certain o'clock certain minutes 02 seconds in the time of the time counter circuit 46, the seconds of the reception date and time in the correct time is estimated to be within the range of from 0 second to 4 seconds. When the difference between the UTC time and the GPS time is +17 seconds, the seconds of the reception date and time in the GPS time is estimated to be within the range of from 17 seconds to 21 seconds.

As described above, a navigation message includes bits that are arranged at a predetermined timing and represent various types of information, and the bit array of some data such as date and time information changes depending on the current date and time. In the electronic timepiece 1 of the present embodiment, bits (estimated bits) are estimated beforehand that are to be received within the estimated possible deviation range from the time a bit to be identified from a received radio signal, and comparison processing is performed in which an actually identified bit (received bit) is compared with the estimated bits. The comparison processing is repeated every time a new code is identified, so that a deviation of the estimated bit array is detected at which it matches the array of identified bits to the extent of a predetermined threshold or more. Then, the detected deviation is identified as the deviation of the date and time counted in the time counter circuit 46 from the correct date and time.

The estimated bit array is generated according to the format of a navigation message based on the current date and time counted in the time counter circuit 46, which includes at least all bits within the possible deviation range from the current date and time. In the illustrated example, the estimated bit array includes the above-described bits from 17 seconds to 21 seconds and additionally includes the subsequent bits from 21 seconds to 27 seconds corresponding to the length of one subframe (6 seconds).

Major examples of bits to be estimated include always constant fixed bits such as the Preamble and the spare bit and bits that can be calculated from the date and time such as the TOW-Count, the WN and the subframe-ID. In addition, flag bits such as the Alert Flag and the Anti-Spoof Flag may also be included, which are normally unchanged but changes when there may be a problem in the availability of the data.

Further, bit arrays of the telemetry message, the predicted orbit information and the like normally remain the same for a certain period of time (e.g. in one day). Accordingly, such bit arrays can also be suitably utilized by storing bit arrays that are identified in the last signal reception in the bit storage section 633 as history bit arrays, and making a determination with respect to each type of information as to whether these bit arrays are usable according to the elapsed time since the last signal reception that are obtained by comparing the history of the last signal reception stored in the history storage section 632 with the date and time counted in the time counter circuit 46, and the like.

In this regard, not all bits in the estimated bit array can be estimated. That is, the estimated bit array is not necessarily composed of only estimated bits that are to be consecutively transmitted, but the estimated bit array may be composed of a mixture of estimated bits and non-estimated bits. As for Word 1 and Word 2 for example, the last 6 bits of Word 1 and the last 8 bits of Word 2, which represent the parity data, are excluded from the estimation.

To compare an identified received bit only with the estimated bits in the estimated bit array, an estimation flag (identification information) is set for each bit in the estimated bit array, which indicates whether the corresponding bit is an estimated bit or a non-estimated bit. An estimation flag array is thus generated.

As illustrated in FIG. 3B, when an identified received bit r(t0) is received at a time and date t0 in the time of the time counter circuit and the possible deviation range is ±2 seconds as described above, the correct date and time tc of receiving the code is within the range of $t0-2 \leq tc \leq t0+2$. Accordingly, among the bits of the estimated bit array c, the received bit r(t0) is compared with bits c(i) that are presumably received within the range of the date and time tc. Since each 30-bit word is transmitted within 0.6 second (i.e. 50 bps (bits per second)), the maximum number of bits compared within the possible deviation range (2×dt=4 seconds) is (100×dt+1)=201. The index (i) of bits are set such that the bit at the head of the range of the date and time tc has an index (i)=0. Among the bits c(i) at indexes within the range of from $0 \leq i \leq 200$, estimated bits, which are indicated by the estimation flags s(i), are compared sequentially or in parallel.

The index (i) of a compared bit c(i) corresponds to the deviation of the bit from the date and time t0 (i.e. the deviation time is calculated as 20×(i−100) msec). The number of comparisons is counted with respect to each deviation by increasing the value of a variable at the same index (i) (comparison number N(i)) of a comparison number array N by 1. Further, the number of mismatches (comparison result information) is counted with respect to each deviation by increasing the value of a variable (mismatch numbers E(i)) of a mismatch number array E by 1 when the comparison result of the corresponding bit is "mismatch".

Depending on the propagation time of a satellite radio signal from a positioning satellite to the ground, the reception date and time of a bit is behind by 3 to 5 bits from the sent date and time of the bit.

Regarding comparison between the estimated bit array and the received bit array, the bit array of the information actually transmitted from a GPS satellite is partly inverted every other word at the 1st to 24th bits (all bits except for the parity data) according to the last bit (30th bit) (inversion sign) of the parity data of the previous word. That is, when the inversion sign is "0", the 1st to 24th bits of the next word are transmitted according to the information without any change. When the inversion sign is "1", all of the 1st to 24th bits of the next word that represent the information are inverted. Accordingly, the number of estimated bit array(s) to be generated is actually not one but equal to the number of combinations of inversion of the words.

Received bits are identified and acquired promptly one by one. As described above, a navigation message is transmitted from a GPS satellite at a rate of 50 bps. Accordingly, in this embodiment, a new bit is identified every 20 msec. However, as described above, bits from different positioning satellites may be identified including the difference in propagation time (reception timing difference), which is up to approximately 20 msec, i.e. one bit.

The electronic timepiece 1 of this embodiment performs the above-described comparison processing for a plurality of positioning satellites in parallel. The capturing and the tracking is performed in an approximately the same manner as the step of receiving radio signals from a plurality of satellites in an ordinary positioning process. However, the electronic timepiece 1 of this embodiment does not require a specific number of positioning satellites for receiving radio signals. Accordingly, the capturing may be terminated after a predetermined capturing time limit as long as a radio signal is received from at least one positioning satellite. Alternatively, the capturing may be continued until a predetermined number of comparisons are performed for received bits of a captured positioning satellite.

When received bits are compared with estimated bits, a false identification of a received bit may occur depending on the reception intensity and the S/N ratio of the satellite radio signal. This may result in imperfect match between the received bits and the estimated bits even when received bits are received at exact timings. On the contrary, when such a false identification occurs at a received bit that is located out of the range of the estimated bits, this may cause a decrease in the number of mismatches. The electronic timepiece 1 makes a determination as to whether only a single mismatch bit number E(i) detected in compared bits falls within a validity range (i.e. satisfies a predetermined match condition), which is determined according to the probability of occurrence of the mismatch number calculated from the probability of false identification p (bit error rate, BER) estimated from the reception intensity. The electronic timepiece 1 thereby specifies the index (i) that corresponds to the deviation.

The probability of false identification p of a bit is determined basically according to the reception intensity and the S/N ratio. The probability of false identification p may be calculated from the reception intensity at the time of capturing a satellite radio signal by using a mathematical formula (which may be an approximation formula). Alternatively, the false identification probability table 634 in which reception intensities are associated with probabilities of false identification p may be stored in the storage section 63 beforehand and is referenced at the end of capturing the satellite radio signal so that the corresponding probability of false identification p is obtained.

When n bits are received with a probability of false identification p, the probability of occurrence P of n false identifications in the n bits is represented by the following equation (1).

$$P = {}_nC_e \times p^e \times (1-p)^{n-e} \qquad (1)$$

The equation (1) has a maximum around e=n×p, and the slope around the maximum becomes less steep as the reception intensity is decreased and the probability of false identification p approaches ½. In the electronic timepiece 1 of this embodiment, it is preferred to specify the upper limit of the probability of false identification p, i.e. the lower limit of the reception intensity.

Figure 4A:
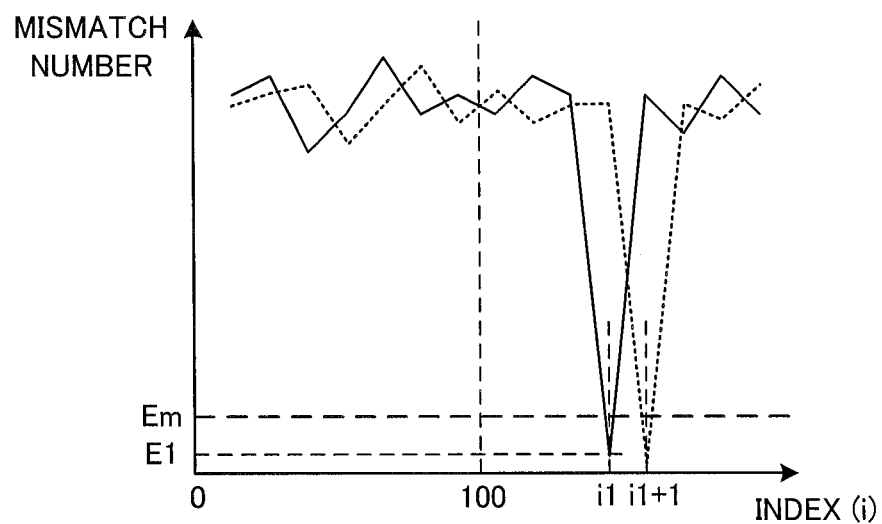
FIG. 4A schematically illustrates the relationship between mismatch number and deviation that are determined between estimated bits and received bits.
Figure 4B:
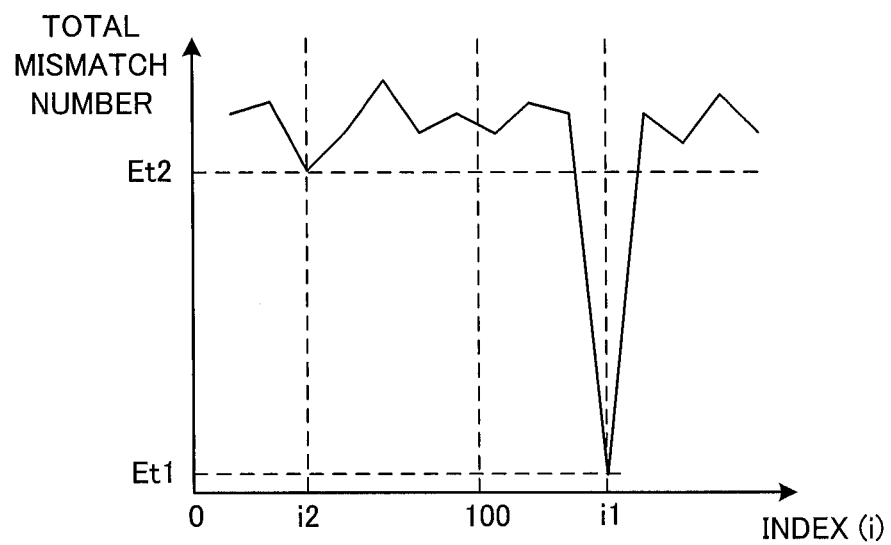
FIG. 4B schematically illustrates the relationship between mismatch number and deviation that are determined between estimated codes and received codes.

FIG. 4A and FIG. 4B schematically illustrate the relationship between the mismatch number between the estimated bit array and the received bit array.

The values of most bits in a navigation message are not related to each other. Accordingly, when a received bit array is compared with the estimated bit array at a wrong phase (i.e. when these bit arrays are relatively displaced from each other), it is normally expected that approximately a half of the codes mismatches as illustrated by the solid line in FIG. 4A. In contrast, at the index (i1) where the received bit array matches the estimated bit array, the number of mismatch bits E(i1) is drastically reduced to "0" or a very low value. In this embodiment, the index (i1) at which the mismatch number E(i1) is equal to or less than a threshold Em (individual match condition) is obtained.

As described above, bits from different positioning satellites may be misaligned with each other by approximately one bit due to the difference in propagation time. On the assumption that the identified bits of all positioning satellites are almost accurate, when the lowest mismatch number E1 for one positioning satellite is detected at E1=E(i1), the lowest mismatch number for the other positioning satellite is detected within the range of index (i1±1) (a relative difference range with a length of predetermined bits). Within the range of index (i1±1), the index (i) at which the mismatch number E(i) is the lowest value is detected with respect to each of the other positioning satellite, so that a phase difference de (reception timing difference) between the detected index (i) and the index (i1) is specified. In the illustrated example, the phase difference de is +1 as illustrated by the dashed line in FIG. 4A.

As illustrated in FIG. 4B, the positions of the lowest mismatch numbers for the respective positioning satellites are detected according to the identified phase difference de, and the sum the mismatch numbers E(i) of the positioning satellites is obtained with respect to each index in view of the detected positions. This can increase the number of compared bits at each deviation by approximately fn times (fn being the number of captured positioning satellites). In this case, the number of total mismatches becomes a lowest mismatch number Et1 at the index (i1) that represents the deviation for a certain positioning satellite. Further, the second lowest mismatch number Et2 is obtained from among the numbers of total mismatches at different deviations. When the probability of occurrence Pt1 of the lowest mismatch number Et1 falls within a validity range relative to the probability of false identification p but the probability of occurrence Pt2 of the second lowest mismatch number Et2 is out of the validity range relative to the probability of false identification p, it is determined that the comparison result for the index (i2) of the second lowest mismatch number Et2 does not indicate the correct deviation. Then, the index (i1) of the lowest mismatch number Et1 is identified as the value that represents the deviation of the date and time t0 of the time counter circuit 46 from the correct date and time tc. Regarding the lowest mismatch number Et1, the determination by the probability of occurrence Pt1 may be omitted since it can be considered that a correct determination can be made only according to the threshold Em.

FIG. 5 is a flowchart illustrating the control of the date and time acquisition processing that is executed by the host CPU 41 in the electronic timepiece 1 of this embodiment.

In the electronic timepiece 1 of this embodiment, according to a predetermined schedule or condition or in response to a user input operation on the operation section 49, the host CPU 41 controls the satellite radio signal receiving and processing section 60 so that the module CPU 61 identifies the correct date and time.

Once the date and time acquisition processing starts, the host CPU 41 activates the satellite radio signal receiving and processing section 60 (Step S101). Further, the host CPU 41 sends initial data to the satellite radio signal receiving and processing section 60, which includes a setting that the object to be acquired is the date and time information and also includes the date and time information counted in the time counter circuit 46 (Step S102). The date and time information includes information on the largest possible deviation ±dt (or half the largest possible deviation dt) that is estimated based on the elapsed time since the last correction of the date and time of the time counter circuit 46. Then, the host CPU 41 waits for a data output from the satellite radio signal receiving and processing section 60. During the waiting time, the host CPU 41 may display a screen image on the display section 47 showing that a radio signal is now being received.

The host CPU 41 waits for a signal from the satellite radio signal receiving and processing section 60 and then acquires the date and time data (Step S103). Thereafter, the host CPU 41 deactivates the satellite radio signal receiving and processing section 60 (Step S104) and corrects the date and time counted in the time counter circuit 46 (Step S105). Further, the host CPU 41 updates the reception history stored in the RAM 43 (Step S106). Then, the host CPU 41 terminates the date and time acquisition processing.

FIG. 6 is a flowchart illustrating the control of date and time information reception processing by the module CPU 61 in the electronic timepiece 1 of this embodiment.

The date and time information reception processing starts when the host CPU 41 activates the satellite radio signal receiving and processing section 60 and the object of acquisition output from the host CPU 41 in Step 5102 is the date and time information.

Once the date and time information reception processing is started, the module CPU 61 performs an initialization such as acquisition and allocation of a memory area, and an operation check (Step S301). The module CPU 61 acquires the date and time information that was output from the host CPU 41 in Step S102, converts the acquired UTC time to the GPS time, and estimates the range of the correct date and time (t0−dt≤tc≤t0+dt) based on the largest possible deviation ±dt (Step S302).

The module CPU 61 generates an estimation flag array s and an estimated bit array c over the range that covers at least all bits presumably received within the estimated range of the correct date and time (Step S303). The module CPU 61 starts receiving radio signals from GPS satellites (Step S304) and captures receivable radio signals from GPS satellites (Step S305). The module CPU 61 detects and captures the signals from the GPS satellites by an attempt to perform a reversed process of spread spectrum in which each C/A code of the GPS satellites is applied to the received radio signals at different phases. The number of satellites to be captured is not limited to one. However, a maximum number may be specified according to the configuration of the satellite radio signal receiving and processing section 60 or the like. In case where satellites more than the maximum number are captured, positioning satellites may be sequentially selected in the descending order of the radio signal reception intensity to maintain a capturing state. The module CPU 61 assigns satellite numbers f to the captured positioning satellites in order and obtains their respective reception intensities I(f).

Once the module CPU 61 captures the signals from the GPS satellites, it starts to identify each bit of the received data while tracking the captured GPS satellites at the captured phase (Step S306). Further, the module CPU 61 sets the count-up number k to the initial value "0" and also sets the captured satellite count fn. The module CPU 61 corrects the estimated bit array based on the deviation of the timing of generating the estimated bit array c and the estimation flag array s in Step 5303 from the timing of actually identifying the first bit (Step S307).

Every time one bit is identified, the module CPU 61 acquires the identified received bit r (Step S308). The module CPU 61 calls and executes pattern match processing (Step S309) and then calls and executes reliability determination processing (Step S310). The module CPU 61 makes a determination as to whether the reliability is OK based on the determination result obtained in the processing of Step S310 (Step S311). If it is determined that the reliability is NG (Step 5311, No), the module CPU 61 makes a determination as to whether a time-out period has elapsed since the start of receiving the radio signals from the GPS satellites (Step S312). If it is determined that the time-out period has elapsed (Step S312, Yes), the control of the module CPU 61 proceeds to Step S316. If it is determined that the time-out period has not elapsed yet (Step S312, No), the module CPU 61 assigns the values of the variables (bits) of the estimated bit array c at indexes (i)≥1 respectively to the variables (bits) of the estimated bit array c at indexes (i-1) and assigns the values of the variables (flags) estimation flag array s at indexes (i)≥1 respectively to the variables (flags) of estimation flag array s at indexes (i-1) so as to shift the arrays by one bit. Further, the module CPU 61 generates an additional bit of the estimated bit array c and the estimation flag array s according to need (Step S313). Then, the control of the module CPU 61 returns to Step S308.

If it is determined in the determination of Step S311 that the reliability is OK (Step S311, Yes), the module CPU 61 acquires the correct GPS date and time (date and time information) based on the index (i) corresponding to the reliable deviation of the estimated bit array and the date and time indicated by the estimated bit array. Then, the module CPU 61 converts the acquired GPS time to the UTC time and sets the timing (Step S314). The module CPU 61 outputs the date and time information to the host CPU 41 at the set timing (Step S315). Then, the control of the module CPU 61 proceeds to Step S316.

Once the control proceeds to Step S316, the module CPU 61 terminates receiving the radio signals from the GPS satellites (Step S316). Then, the module CPU 61 terminates the date and time information reception processing.

Figure 7:
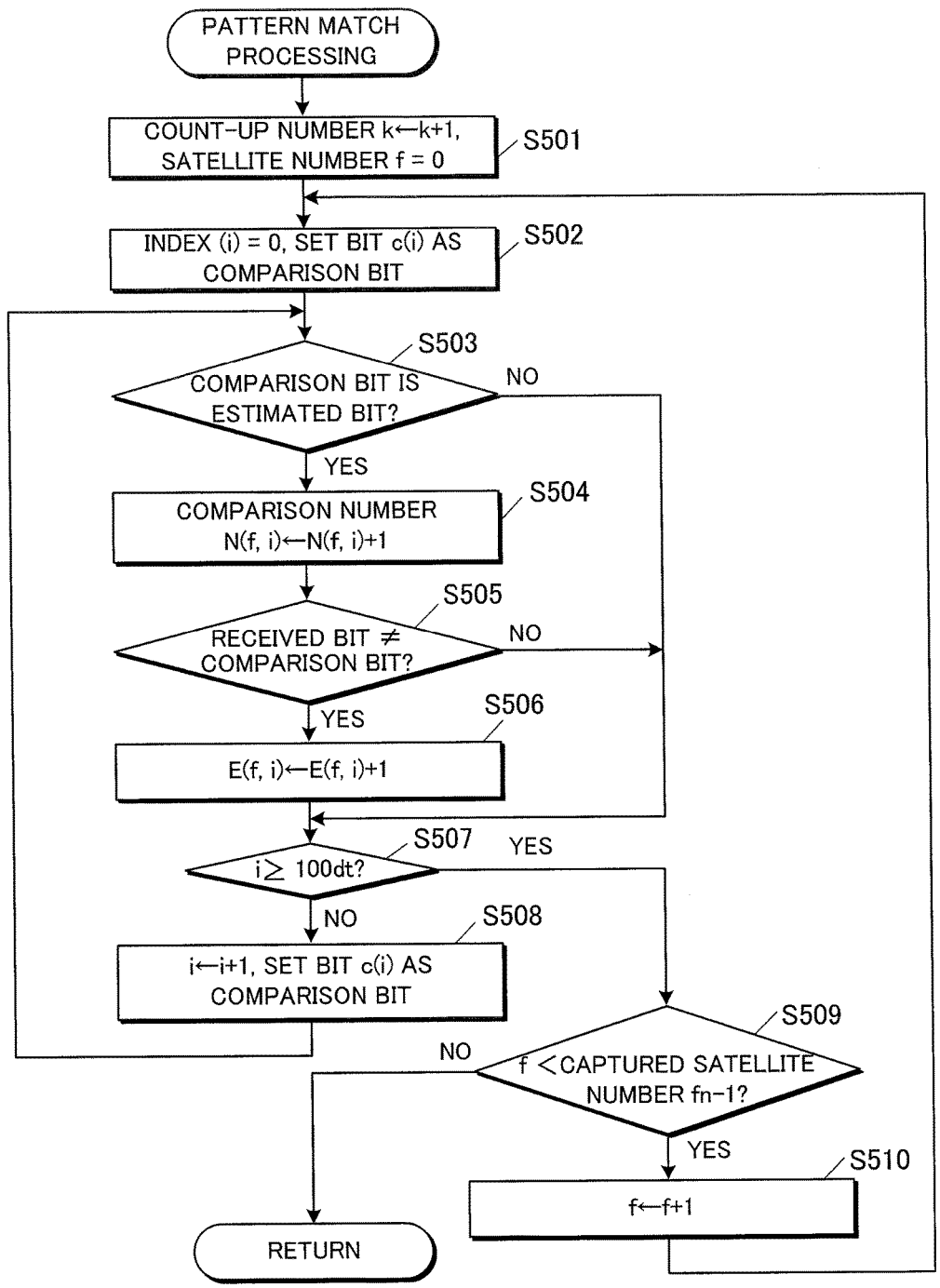
FIG. 7 is a flowchart of the control steps of pattern match processing.

FIG. 7 is a flowchart illustrating the control of the pattern match processing that is called in Step 309 of the date and time information reception processing.

Once the pattern match processing is called, the module CPU 61 adds "1" to the count-up number k and sets the satellite number f to the initial value "0" (Step S501). The module CPU 61 sets the index (i) to the initial value "0" and sets the bit c(i) at the index (i) of the estimated bit array c as a bit for comparison (comparison bit) (Step S502).

The module CPU 61 references the estimation flag s(i) and makes a determination as to whether the comparison bit is an estimated bit (Step S503). If it is determined that the comparison bit is not an estimated bit (Step S503, No), the control of the module CPU 61 proceeds to Step S507.

If it is determined that the comparison bit is an estimated bit (Step S503, Yes), the module CPU 61 adds "1" to the comparison number N(f, i) (Step S504) and then makes a determination as to whether the acquired received bit r is equal to the comparison bit, i.e. the bit c(i) (Step S505). If it is determined that they are equal (Step S505, No), the control of the module CPU 61 proceeds to Step S507.

If it is determined that the received bit r is not equal to the comparison bit (Step S505, Yes), the module CPU 61 adds "1" to the mismatch number E(f, i) (Step S506). Then, the control of the module CPU 61 proceeds to Step S507.

Once the control proceeds to Step S507, the module CPU 61 makes a determination as to whether the index (i) is equal to or greater than 100 dt (Step S507). That is, the module CPU 61 makes a determination as to whether the comparison is completed all over the comparison range from the bit c(0) to the bit c(100dt). If it is determined that the index (i) is less than 100 dt, i.e. the comparison processing is not completed over the comparison range (Step S507, No), the module CPU 61 adds "1" to the index (i) and sets the bit c(i) as the comparison bit (Step S508). Then, the control of the module CPU 61 returns to Step S503.

If it is determined that the index (i) is equal to or greater than 100 dt, i.e. the comparison processing is completed all over the comparison range from bit c(0) to the estimated bit c(100dt) (Step S507, Yes), the module CPU 61 makes a determination as to whether the value of the satellite number f is less than the captured satellite count fn-1 (Step S509). If it is determined that the satellite number f is less than the captured satellite count fn-1 (Step S509, Yes), the module CPU 61 adds "1" to the satellite number f (Step S510). Then, the control returns to the step S502. If it is determined that the satellite number f is not less than the captured satellite count fn-1 (Step S509, No), the module CPU 61 terminates the pattern match processing. Then, the control returns to the date and time information reception processing.

The order of comparisons based on the index (i) and the satellite number f may be suitably changed.

Figure 8:
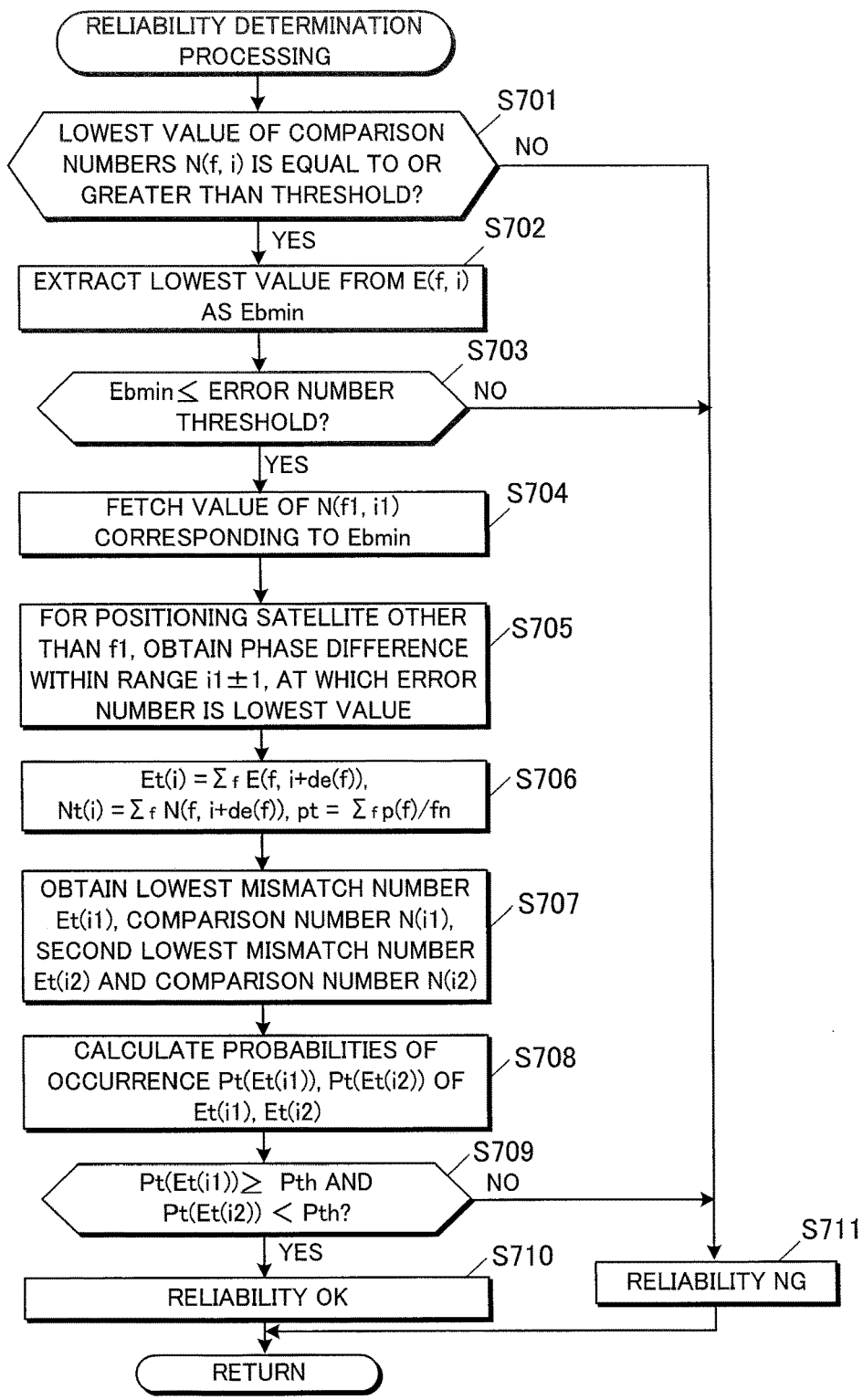
FIG. 8 is a flowchart of the control steps of reliability determination processing.

FIG. 8 is a flowchart illustrating the control of the reliability determination processing that is called in Step S310 of the date and time information reception processing.

Once the reliability determination processing is called, the module CPU 61 makes a determination as to whether the lowest value of the comparison numbers N(f, i) is equal to or greater than a threshold (Step S701). If it is determined that the lowest value is less than the threshold (Step S701, No), the control proceeds to Step S712 where the module CPU 61 determines the reliability as NG (Step S711) and then terminates the reliability determination processing.

If it is determined that the lowest value of the comparison numbers N(f, i) is greater than the threshold (Step S701, Yes), the module CPU 61 extracts the lowest value from among the mismatch numbers E(i) as a minimum mismatch number Ebmin (Step S702). The module CPU 61 makes a determination as to whether the minimum mismatch number Ebmin is equal to or less than an error number threshold Eth (Step S703). The error number threshold Eth may be a fixed value that is based on the above-described threshold of the comparison number or a variable value that is selected according to the lowest value of the comparison numbers N(f, i).

If it is determined that the minimum mismatch number Ebmin is greater than the error number threshold Eth (Step S703, No), the control by the module CPU 61 proceeds to Step S711 where the reliability is determined as NG. If it is determined that the minimum mismatch number Ebmin is equal to or less than the error number threshold Eth (Step S703, Yes), the module CPU 61 fetches the value of the comparison number N(f1, i1) at the satellite number (f1) and the index (i1) that corresponds to the minimum mismatch number Ebmin (Step S704).

The module CPU 61 detects the lowest value of the error numbers within the range of the indexes i1±1 with respect to each positioning satellite other than the satellite of the satellite number f1. In order to perform an alignment to align the position of the lowest error numbers, the module CPU 61 determines the phase difference de(f) of the received data of the positioning satellite of the satellite number f (Step S705).

In this step, the control may be configured to proceed to Step S711 if any value of the lowest error numbers of the positioning satellites is greater than the error number threshold Eth. Alternatively, the data on a positioning satellite with the lowest error number greater than the error number threshold Eth may be excluded in the following processing.

The module CPU 61 gathers the mismatch information of each positioning satellite (Step S706). The module CPU 61 calculates total mismatch numbers Et(i) by Et(i)=$\Sigma_{(0 \leq f < fn)}$ E(f, i+de(f)) and also calculates total comparison numbers Nt(i) corresponding to the respective total mismatch numbers Et(i) by Nt(i)=$\Sigma_{(0 \leq f < fn)}$ N(f, i+de(f)). Further, the module CPU 61 determines probabilities of false identification p(f) from the reception intensities I(f) of the respective positioning satellites obtained in Step S305 and calculates a total probability of false identification pt (integrated probability of false identification) from these probabilities of false identification p(f) by $pt=\Sigma_{(0 \le f < fn)} p(f)/fn$.

The module CPU 61 fetches the lowest value from the calculated total mismatch numbers Et(i) as a lowest mismatch number Et1=Et(i1) and the corresponding total comparison number Nt(i1), and the second lowest value as a second lowest mismatch number Et2=Et(i2) and the corresponding total comparison number Nt(i2) (Step S707). The module CPU 61 calculates a probability of occurrence Pt(Et1) of the lowest mismatch number Et1 and a probability of occurrence Pt(Et2) of the second lowest mismatch number Et2 (Step S708).

The module CPU 61 makes a determination as to whether the calculated probability of occurrence Pt(Et1) is equal to or greater than a threshold Pth and the probability of occurrence Pt(Et2) is less than the threshold Pth (validity standard) (i.e. as to whether a predetermined reliability condition is satisfied) (Step S709). As described above, the determination by the probability of occurrence Pt(Et1) may be omitted. In this case, the calculation of the probability of occurrence Pt(Et1) in Step S708 is not necessary either.

If it is determined that the probability of occurrence Pt(Et1) is equal to or greater than the threshold Pth and the probability of occurrence Pt(Et2) is less than the threshold Pth (Step S709, Yes), the module CPU 61 determines the reliability as OK (Step S710) and terminates the reliability determination processing. Then, the control returns to the date and time information reception processing. If it is determined that the probability of occurrence Pt(Et1) less than the threshold Pth or the probability of occurrence Pt(Et2) is equal to or greater than the threshold Pth (Step S709, No), the module CPU 61 determines the reliability as NG (Step S711) and terminates the reliability determination processing. Then, the control returns to the date and time information reception processing.

As described above, the satellite radio signal receiving and processing section 60 of the electronic timepiece 1 includes the receiving section 67 (the RF section 64, the base band converting section 65, the capturing and tracking section 66) that receives and demodulates a radio signal from a positioning satellite to identify the bits of the signal as received bits r, and the module CPU 61. As the comparing section 610, the module CPU 61 compares each received bit of a plurality of positioning satellites with the estimated bits in the estimated bit array c that are presumably received within the possible deviation range (±dt) from the current date and time acquired as the reception time t0 of the received bit, so as to obtain comparison result information between the received bits r and the estimated bits in relation to the indexes (i) with respect to the respective plurality of positioning satellites, in which the indexes (i) correspond to the deviations within the possible deviation range (±dt). As the comparison result integrating section 611, the module CPU 61 integrates the comparison result information on the received bits of the plurality of positioning satellites. As the deviation specifying section 612, the module CPU 61 specifies the index (i) that corresponds to the deviation of the estimated bits from the received bits r at which the reliability is determined as OK in the reliability determination processing. As the date and time acquiring section 613, the module CPU 61 acquires the date and time information based on the deviation (index (i)) at which the reliability is determined as OK.

Since bits that are obtained from radio signals received from a plurality of positioning satellites are integrally used in parallel, it becomes possible to increase the number of bits that are compared in a certain time. Therefore, the correct date and time information can be acquired more reliably in a short time. In particular, even when the reception condition of radio signals from positioning satellites is poor and a false identification is likely to occur, the date and time information can be acquired better while avoiding an extension of the reception time and reducing the probability of failure in date and time acquisition.

Further, as the comparison result integrating section 611, the module CPU 61 also serves as: the timing difference specifying section 614 that specifies the phase difference de(f) that represents the difference in reception timing of the received bits r due to the difference in propagation time between the plurality of positioning satellites; the deviation aligning section 615 that uses the phase difference de(f) to align the deviations (indexes (i)) of the respective plurality of positioning satellites associated with the comparison result information; and the aligned data integrating section 616 that integrates the comparison result information of the plurality of positioning satellites with respect to each aligned deviation. Therefore, even when the received and captured positioning satellites are located at different positions and the propagation times are relatively different from each other, the difference is aligned so that they can be utilized for acquiring the correct time information.

As the timing difference specifying section 614, the module CPU 61 serves as: the individual deviation specifying section 617 that specifies the deviation for at least one of the plurality of positioning satellites, at which the mismatch number E(i), which is the comparison result information for a plurality of received bits r, is equal to or less than the predetermined error number threshold Eth; and the relative difference specifying section 618 that specifies the phase difference de(f) from the specified deviation. That is, the difference in reception timing is readily specified by using the characteristics of the detection objects so that the alignment can be performed.

As the comparing section 610, the module CPU 61 counts the comparison number N(f, i) of an estimated bit (bit c(i)) that is compared with a plurality of received bits r and the mismatch number E(f, i) in the comparisons between the estimated bit c(i) and the plurality of received bits r with respect to each of the plurality of positioning satellites (f) and each deviation (i). As the individual deviation specifying section 617, the module CPU 61 determines that a deviation satisfies the individual match condition of a positioning satellite if the mismatch number E(f, i) relative to the comparison number N(f, i) at the deviation (i) of the positioning satellite (f) is equal to or less than the predetermined upper threshold Em.

As described above, the timing of the object to be specified is firstly detected with respect to each positioning satellite, and the following processing is performed based on the detected timing. Therefore, the date and time acquisition processing can be performed readily and efficiently.

As the aligned data integrating section 616, the module CPU 61 calculates the total mismatch numbers Et(i), which are the sums of the mismatch numbers E(f, i) of the positioning satellites with respect to respective indexes (i+de(f)) that correspond to the aligned deviations, and the total comparison numbers Nt(i), which are the sums of the comparison numbers N(f, i) that correspond to the total mismatch numbers E(f, i), so as to integrate the comparison result information. Since the comparison results are based on the presence or absence of a mismatch, they can be integrated by simple addition. Therefore, by the simple processing with the improved comparison accuracy, the date and time can be identified more reliably almost without increasing the processing time.

As the deviation specifying section 612, the module CPU 61 makes a determination as to whether the match condition is satisfied according to whether the predetermined reliability condition of the total mismatch numbers Et(i) is satisfied.

That is, the determination of the lowest mismatch number Et1=Et(i1) is made not only by a fixed threshold but also whether the value is proper. Therefore, when the signal reception intensity is low and a false identification is likely to occur, the determination as to whether the determination is correct can be made more precisely.

The module CPU 61 also serves as the false identification probability obtaining section 619 that obtains the probability of false identification p of a bit based on the intensity of a radio signal received by the receiving section 67 (the RF section 64, the base band converting section 65 and the capturing and tracking section 66).

The module CPU 61 also serves as the integrated false identification probability calculating section 620 that calculates the total probability of false identification pt from the probabilities of false identification p of the respective plurality of positioning satellites.

As the deviation specifying section 612, the module CPU 61 determines that the predetermined reliability condition is satisfied when the probability of occurrence Pt(Et2) of the second lowest mismatch number Et2, which is the second lowest value in the total mismatch numbers, in the total comparison number Nt(i2) corresponding to the second lowest mismatch number Et2=Et(i2) is less than the predetermined threshold Pth that is determined according to the total probability of false identification pt. This proves with a desired statistical certainty that the second lowest mismatch number Et2 is not caused by an accidental false identification.

This determination can confirm with the desired certainty that the other deviations are not suitable for matching the estimated bit array c with the received bit array. Therefore, the correct date and time can be acquired more reliably.

The electronic timepiece 1 includes the storage section 63 that stores reception intensities of a radio signal and the corresponding probabilities of false identification p as the false identification probability table 634. As the false identification probability obtaining section 619, the module CPU 61 references the false identification probability table 634 according to a reception intensity to obtain a probability of false identification p. Therefore, the probability of false identification p can be obtained readily.

As the deviation specifying section 612, the module CPU 61 makes a determination as to whether the probability of occurrence Pt1 of the lowest mismatch number Et1, which is the value of the total mismatch number Et(i1), in the total comparison number Nt(i1) corresponding to the lowest mismatch number Et1 is equal to or greater than the threshold Pth that is selected according to the total probability of false identification pt. Therefore, the deviation from the correct date and time can be determined suitably according to not only the condition that the lowest mismatch number E(i1) of a single positioning satellite is equal to or less than the threshold Em but also the more strict condition.

As the relative difference specifying section 618, the module CPU 61 specifies the phase difference de(f) of the plurality of satellites by obtaining a reference deviation, which is a deviation from the received bits of one satellite that satisfies the condition that the lowest mismatch number E(i1) is equal to or less than the threshold Em, and obtaining a deviation from the received bits of the other satellite within the range of ±1 bit from the reference deviation, at which the received bit array r of the other satellite matches the estimated bit array c to the highest degree. Accordingly, it is required to neither perform the processing out of the range nor prepare steps for coping with an incorrectly identified deviation at an impossible position. Therefore, the correct reception timing difference can be identified readily and reliably.

Further, since GPS satellites are the target positioning satellites of the signal reception and the predetermined range of the relative difference has a length of one bit in both sides, the timing difference between GPS satellites can be readily specified and aligned by making a simple modification to a circuit on a chip for major conventional satellite radio signal reception processing or to the control thereof.

As the comparing section 610, the module CPU 61 compares one received bit r with estimated bits (bits c(i)) that are located within the possible deviation range (±dt) from the reception date and time tO of the received signal every time the receiving section 67 (the RF section 64, the base band converting section 65 and the capturing and tracking section 66) identifies the received bit r. Accordingly, the index (i1) of the lowest mismatch number E(i1) is promptly detected in real time without any delay so that the processing proceeds to the steps of acquiring the correct date and time.

Further, the possible deviation range (±dt) is determined according to the elapsed time since the last correction of the current date and time in the time counter circuit 46 that counts the acquired current date and time. Accordingly, a proper deviation range can be obtained by a simple calculation, and the deviation from the correct date and time can be identified efficiently only by the processing within the possible deviation range.

The module CPU 61 also serves as the estimated bit array generating section 621 that generates the estimated bit array c that includes the estimated bits within the possible deviation range (±dt) and the estimation flags s(i) that distinguish the estimated bits from non-estimated bits in the estimated bit array c.

Further, as the comparing section 610, the module CPU 61 compares a received bit r with bits c(i) at indexes (i) that are specified as estimated bits based on the estimation flags s(i). Accordingly, comparable bits can be readily specified in the estimated bit array c that includes both estimated bits and non-estimated bits, so that necessary comparisons are performed.

The electronic timepiece 1 of this embodiment includes the satellite radio signal receiving and processing section 60, the time counter circuit 46 that counts the current date and time, and the host CPU 41 that serves as the date and time correcting section 410 to correct the date and time counted in the time counter circuit 46 by using the date and time acquired by the module CPU 61 that serves as the date and time acquiring section 613. This configuration enables acquiring the date and time information correctly and reliably all over the world without an increase of the reception time of a radio signal from a positioning satellite. Therefore, it is possible to provide the correct and light-weight electronic timepiece 1 to a user without an increase in size and weight of the electronic timepiece 1.

Further, the usage of the above-described date and time acquiring method enables acquiring the correct date and time rapidly at a higher accuracy and higher probability without an increase in the reception time of a satellite radio signal.

Further, installing a program 631 for performing the processing of the above-described date and time information reception to a computer from a recording medium having the program thereon and executing the program enables a variety of electronic equipment to acquire the date and time more reliably while avoiding an extension of the reception time.

The present invention is not limited to the above-described embodiment, and various changes can be made.

For example, in the above-described embodiment, the time of a mismatch number that is equal to or less than the threshold Em in any one of GPS satellites is set as the reference, and the difference of the lowest mismatch numbers of the respective GPS satellites are aligned within the range of ±1 bit. However, instead of the lowest mismatch numbers obtained from the received bits of the plurality of GPS satellites, a mismatch number that is equal to or less than the threshold Em may be detected only in the received bits of a predetermined specific single GPS satellite (e.g. one with the strongest reception intensity).

Alternatively, lowest mismatch numbers may be simply determined in respective GPS satellites without using the threshold Em, and when a deviation that corresponds to a lowest mismatch number is not within the range of ±1 bit (2 bits), it may be determined that an alignment of the timing is failed, and another alignment is performed again.

In the above-described embodiment, the reception timing is aligned to cope with the difference in propagation time between the plurality of satellites. However, when the timepiece has predicted satellite orbit data beforehand and performs (can perform) a signal reception only in a predefined direction, or when the zenith angle does not vary to a large extent since the timepiece utilizes quasi-zenith satellites for example, it is possible to omit the alignment of reception timing. When the difference in reception timing can be calculated based on the current position information and the orbit information, the calculated value may be used instead or in combination.

In the above-described embodiment, the mismatch numbers and the comparison numbers are counted as the comparison result information. However, match numbers may be counted instead of the mismatch numbers, which gives the same results.

In the above-described embodiment, the reliability is determined as OK when only the probability of occurrence $Pt(Et1)=Pt(Et(i1))$ of the total lowest mismatch number $Et1$ is within a validity range that is determined based on the total probability of false identification pt or when the probability of occurrence $Pt(Et2)=Pt(Et(i2))$ of the second lowest mismatch number $Et2$ is not within the proper range that is determined based on the total probability of false identification pt. Instead, the reliability may be determined simply according to the ratio of the second lowest mismatch number $Et2$ to the total comparison number $Nt(i2)$. Further, instead of the probabilities of occurrence, the rate of occurrence of a bit array composed of N comparable bits and includes e mismatches ($_NC_e/2^N$) may be compared with a threshold.

In the above-described embodiment, every time fn bits (fn being the number of captured satellites), i.e. one bit per each of the fn positioning satellites, are identified, the comparison processing is performed in real time. However, the comparison may be performed at once after plural sets of bits are obtained.

In the above-described embodiment, the possible deviation range is determined according to the elapsed time since the last correction of the date and time in the time counter circuit 46. However, other conditions such as temperature may be additionally used for the determination. Alternatively, the possible deviation range is uniformly set to ±3 seconds when the elapsed time is equal to or shorter than 6 days.

In the above-described embodiment, the processing for radio signals received from GPS satellites is described as an example. Instead, radio signals from the other positioning satellites, e.g. radio signals of the GLONASS or the Galileo, may also be used according to their own format of a navigation message for acquiring the date and time. As long as the length of each bit is the same (20 msec), it is possible to integrate (add up) bits of positioning satellites that are based on different forms of a navigation message such as satellites of the GPS and GLONASS. However, the accuracy of signal reception may not always be simply improved according to the number of captured satellites, since it is required to generate individual estimated bits and the arrangement of estimated bits and non-estimated bits may be different between estimated bit arrays.

In the above-described embodiments, the estimation flag array s is used to omit the comparison at an index (i) where the bit is not estimated. Instead, for example, only estimated bits may be arranged as the estimated bit array along with their indexes so that estimated bits are distinguished from non-estimated bits without using the estimation flag array s.

The chip that constitutes the satellite radio signal receiving and processing section 60 may be traded or used independently from the electronic timepiece 1. In such cases, since the satellite radio signal receiving and processing section 60 itself is required to acquire the date and time information in replace of the time counter circuit 46, it may further include an RTC (real time clock) or a time counter circuit that continuously counts the date and time.

Further, in the embodiment described above, a case where the module CPU 61 and the host CPU 41 carry out processing as processors in accordance with a program (software). The processor may carry out part of or a whole of processing by hardware such as a specific logic circuit.

In the above description, the storage section 63 of a non-volatile memory is described as an example of the computer-readable recording medium that stores programs for the processing of the module CPU 61 of the present invention such as the date and time information reception processing. However, the present invention is not limited thereto. The computer-readable recording medium may be an HDD (hard disk drive), a portable recording medium such as a CD-ROM and a DVD disk, or the like. Further, the present invention also encompasses a carrier wave for distributing the program of the present invention through a communication line.

The specific configurations, operations, and steps described in the embodiment above may be modified without departing from the spirit of the present invention.

While some embodiments of the present invention are described, the scope of the present invention is not limited to the above-described embodiment but encompasses the scope of the invention recited in the claims and the scope of the equivalents thereof.

What is claimed is:

1. A satellite radio signal receiver, comprising:
   a receiving section which receives radio signals from a plurality of satellites and demodulates the signals to identify bits of the demodulated signals as received bits; and
   a processor,
      wherein the processor compares each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites, wherein the processor integrates the comparison result information on the received bits of the plurality of satellites, wherein the processor specifies a deviation that satisfies a predetermined match condition of the received bits and the estimated bits based on the integrated comparison result information, wherein the processor acquires date and time information based on date and time indicated by the estimated bits of the deviation that satisfies the predetermined match condition, wherein the processor specifies a reception timing difference of the received bits which is due to a difference in propagation time between the plurality of satellites, wherein the processor uses the reception timing difference to align the deviations that are respectively associated with the plurality of satellites in the comparison result information, wherein the processor integrates the comparison result information of the plurality of satellites by using the respective aligned deviations, wherein the processor specifies a deviation for at least one of the plurality of satellites, in which the deviation satisfies a predetermined individual match condition of the comparison result information on the received bits of the satellite, wherein the processor specifies the reception timing difference by using the specified deviation as a reference, wherein the processor counts comparison numbers and mismatch numbers with respect to the respective deviations and the respective plurality of satellites, in which the comparison numbers are the numbers of comparisons between the received bits and the estimated bits, and the mismatch numbers are the numbers of mismatches in comparisons between the received bits and the estimated bits, and wherein when the mismatch number relative to the comparison number at a deviation of a satellite is equal to or less than a predetermined upper limit threshold among the comparison numbers and the mismatch numbers with respect to the respective deviations and the respective plurality of satellites, the processor determines that the deviation of the satellite satisfies the individual match condition.

2. The satellite radio signal receiver according to claim 1, wherein the processor counts comparison numbers and mismatch numbers with respect to the respective deviations and the respective plurality of satellites, in which the comparison numbers are the numbers of comparisons between the received bits and the estimated bits, and the mismatch numbers are the numbers of mismatches in comparisons between the received bits and the estimated bits, and wherein the processor integrates the comparison result information by calculating total mismatch numbers which are sums of the mismatch numbers of the plurality of satellites with respect to respective aligned deviations and total comparison numbers which are sums of the comparison numbers corresponding respectively to the total mismatch numbers.

3. The satellite radio signal receiver according to claim 1, wherein every time the receiving section identifies a new received bit, the processor compares the new received bit with estimated bits that are located within the possible deviation range from a reception date and time of the new received bit.

4. The satellite radio signal receiver according to claim 1, wherein the possible deviation range is determined according to an elapsed time since a last correction of the current date and time counted in a time counting section which counts the acquired current date and time.

5. The satellite radio signal receiver according to claim 1, wherein the processor generates an estimated bit array which includes the estimated bits within the possible deviation range and identification information which distinguishes the estimated bits from a non-estimated bit in the estimated bit array, and wherein the processor compares the received bits with the estimated bits based on the identification information.

6. An electronic timepiece, comprising:
the satellite radio signal receiver according to claim 1;
a time counting section which counts the current date and time; and
a timepiece processor which corrects the date and time counted in the time counting section by using the date and time information acquired by the processor.

7. A date and time acquiring method, comprising:
receiving radio signals from a plurality of satellites and demodulating the signals to identify received bits of the demodulated signals as received bits;
comparing each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites;
integrating the comparison result information on the received bits of the plurality of satellites;
specifying a deviation that satisfies a predetermined match condition of the received bits and the estimated bits based on the comparison result information;
acquiring date and time information based on date and time indicated by the estimated bits of the deviation that satisfies the predetermined match condition;
specifying a reception timing difference of the received bits which is due to a difference in propagation time between the plurality of satellites;
using the reception timing difference to align the deviations that are respectively associated with the plurality of satellites in the comparison result information;
integrating the comparison result information of the plurality of satellites by using the respective aligned deviations;
specifying a deviation for at least one of the plurality of satellites, in which the deviation satisfies a predetermined individual match condition of the comparison result information on the received bits of the satellite;
specifying the reception timing difference by using the specified deviation as a reference;
counting comparison numbers and mismatch numbers with respect to the respective deviations and the respective plurality of satellites, in which the comparison numbers are the numbers of comparisons between the received bits and the estimated bits, and the mismatch numbers are the numbers of mismatches in comparisons between the received bits and the estimated bits; and when the mismatch number relative to the comparison number at a deviation of a satellite is equal to or less than a predetermined upper limit threshold among the comparison numbers and the mismatch numbers with respect to the respective deviations and the respective plurality of satellites, determining that the deviation of the satellite satisfies the individual match condition.

8. A satellite radio signal receiver, comprising:
a receiving section which receives radio signals from a plurality of satellites and demodulates the signals to identify bits of the demodulated signals as received bits; and
a processor,
wherein the processor compares each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites,
wherein the processor integrates the comparison result information on the received bits of the plurality of satellites,
wherein the processor specifies a deviation that satisfies a predetermined match condition of the received bits and the estimated bits based on the integrated comparison result information,
wherein the processor acquires date and time information based on date and time indicated by the estimated bits of the deviation that satisfies the predetermined match condition,
wherein the processor specifies a reception timing difference of the received bits which is due to a difference in propagation time between the plurality of satellites,
wherein the processor uses the reception timing difference to align the deviations that are respectively associated with the plurality of satellites in the comparison result information,
wherein the processor integrates the comparison result information of the plurality of satellites by using the respective aligned deviations,
wherein the processor counts comparison numbers and mismatch numbers with respect to the respective deviations and the respective plurality of satellites, in which the comparison numbers are the numbers of comparisons between the received bits and the estimated bits, and the mismatch numbers are the numbers of mismatches in comparisons between the received bits and the estimated bits, and
wherein the processor integrates the comparison result information by calculating total mismatch numbers which are sums of the mismatch numbers of the plurality of satellites with respect to respective aligned deviations and total comparison numbers which are sums of the comparison numbers corresponding respectively to the total mismatch numbers.

9. A satellite radio signal receiver, comprising:
a receiving section which receives radio signals from a plurality of satellites and demodulates the signals to identify bits of the demodulated signals as received bits; and
a processor,
wherein the processor compares each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites,
wherein the processor integrates the comparison result information on the received bits of the plurality of satellites,
wherein the processor specifies a deviation that satisfies a predetermined match condition of the received bits and the estimated bits based on the integrated comparison result information,
wherein the processor acquires date and time information based on date and time indicated by the estimated bits of the deviation that satisfies the predetermined match condition,
wherein the processor specifies a reception timing difference of the received bits which is due to a difference in propagation time between the plurality of satellites,
wherein the processor uses the reception timing difference to align the deviations that are respectively associated with the plurality of satellites in the comparison result information,
wherein the processor integrates the comparison result information of the plurality of satellites by using the respective aligned deviations,
wherein the processor specifies a deviation for at least one of the plurality of satellites, in which the deviation satisfies a predetermined individual match condition of the comparison result information on the received bits of the satellite,
wherein the processor specifies the reception timing difference by using the specified deviation as a reference, and
wherein the processor specifies the reception timing difference between the plurality of satellites by obtaining a reference deviation that is a deviation from received bits of one satellite that satisfies the individual match condition and then obtaining a deviation from received bits of each of the other satellite within a phase difference range of a predetermined number of bit from the reference deviation at which received bits match estimated bits to a highest degree.

10. A date and time acquiring method, comprising:
receiving radio signals from a plurality of satellites and demodulating the signals to identify received bits of the demodulated signals as received bits;
comparing each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites;

integrating the comparison result information on the received bits of the plurality of satellites;

specifying a deviation that satisfies a predetermined match condition of the received bits and the estimated bits based on the comparison result information;

acquiring date and time information based on date and time indicated by the estimated bits of the deviation that satisfies the predetermined match condition;

specifying a reception timing difference of the received bits which is due to a difference in propagation time between the plurality of satellites;

using the reception timing difference to align the deviations that are respectively associated with the plurality of satellites in the comparison result information;

integrating the comparison result information of the plurality of satellites by using the respective aligned deviations;

counting comparison numbers and mismatch numbers with respect to the respective deviations and the respective plurality of satellites, in which the comparison numbers are the numbers of comparisons between the received bits and the estimated bits, and the mismatch numbers are the numbers of mismatches in comparisons between the received bits and the estimated bits; and integrating the comparison result information by calculating total mismatch numbers which are sums of the mismatch numbers of the plurality of satellites with respect to respective aligned deviations and total comparison numbers which are sums of the comparison numbers corresponding respectively to the total mismatch numbers.

11. A date and time acquiring method, comprising:

receiving radio signals from a plurality of satellites and demodulating the signals to identify received bits of the demodulated signals as received bits;

comparing each received bit of the plurality of satellites with estimated bits which are estimated to be received within a possible deviation range from a current date and time acquired as a reception timing of the received bit, so as to obtain comparison result information between the received bits and the estimated bits in relation to deviations within the possible deviation range with respect to each of the plurality of satellites;

integrating the comparison result information on the received bits of the plurality of satellites;

specifying a deviation that satisfies a predetermined match condition of the received bits and the estimated bits based on the comparison result information;

acquiring date and time information based on date and time indicated by the estimated bits of the deviation that satisfies the predetermined match condition;

specifying a reception timing difference of the received bits which is due to a difference in propagation time between the plurality of satellites;

using the reception timing difference to align the deviations that are respectively associated with the plurality of satellites in the comparison result information;

integrating the comparison result information of the plurality of satellites by using the respective aligned deviations;

specifying a deviation for at least one of the plurality of satellites, in which the deviation satisfies a predetermined individual match condition of the comparison result information on the received bits of the satellite;

specifying the reception timing difference by using the specified deviation as a reference; and specifying the reception timing difference between the plurality of satellites by obtaining a reference deviation that is a deviation from received bits of one satellite that satisfies the individual match condition and then obtaining a deviation from received bits of each of the other satellite within a phase difference range of a predetermined number of bit from the reference deviation at which received bits match estimated bits to a highest degree.

12. The satellite radio signal receiver according to claim 8, wherein the processor makes a determination as to whether the match condition is satisfied according to whether a predetermined reliability condition of the total mismatch numbers is satisfied.

13. The satellite radio signal receiver according to claim 12, wherein the processor obtains probabilities of false identification of the received bits based on intensities of the radio signals received by the receiving section, wherein the processor calculates an integrated probability of false identification from the obtained probabilities of false identification of the respective plurality of satellites, and wherein the processor determines that the predetermined reliability condition is satisfied when a probability of occurrence of a second lowest mismatch number in a corresponding total comparison number is not within a predetermined validity range that is determined according to the integrated probability of false identification, in which the second lowest mismatch number is a second lowest value in the total mismatch numbers.

14. The satellite radio signal receiver according to claim 13, further comprising:

a storage section which stores a probability table in which reception intensities of a radio signal are associated with probabilities of false identification, wherein the processor references the probability table based on the intensities of the radio signals to obtain the probabilities of false identification.

15. The satellite radio signal receiver according to claim 13, wherein the predetermined reliability condition is satisfied at least when a probability of occurrence of a lowest mismatch number in a corresponding total comparison number is within the predetermined validity range that is determined according to the integrated probability of false identification, in which the lowest mismatch number is a lowest value in the total mismatch numbers.

16. The satellite radio signal receiver according to claim 14, wherein the predetermined reliability condition is satisfied at least when a probability of occurrence of a lowest mismatch number in a corresponding total comparison number is within the predetermined validity range that is determined according to the integrated probability of false identification, in which the lowest mismatch number is a lowest value in the total mismatch numbers.

17. The satellite radio signal receiver according to claim 9, wherein the plurality of satellites are GPS satellites, and
wherein the relative difference range of the predetermined number of bit has a length of one bit in both sides from the reference deviation.

* * * * *